UNITED STATES PATENT OFFICE.

GEORGE T. LEWIS, OF PHILADELPHIA, PENNSYLVANIA.

LEAD PIGMENT.

SPECIFICATION forming part of Letters Patent No. 437,700, dated October 7, 1890.

Application filed July 8, 1889. Serial No. 316,843. (No specimens.)

*To all whom it may concern:*

Be it known that I, GEORGE T. LEWIS, of the city and county of Philadelphia, State of Pennsylvania, have invented a new and useful Improvement in the Manufacture of the Pigment Sublimed Lead, of which the following is a specification.

Sublimed lead is a white pigment consisting mainly in sulphate, sulphite, and oxide of lead. This is manufactured either directly from galena ore (native lead sulphide) or indirectly from this. In the first case galena is exposed to the joint action of heat and a current of air, whereby it is changed into fumes. In the last case the ore is first smelted, so as to smelt down into the metallic state a large portion of the lead, together with any precious metals, and the slag and fumes from this treatment are then treated to produce the white pigment. As galena generally contains zinc, very often in large quantities, the pigment is not a pure lead pigment. This is particularly the case where the pigment is made indirectly from galena ore, as in this case the zinc remains in slag and fumes, while part of the lead smelts down, and the pigment from this slag and fumes will contain much zinc. Now, blende, when sublimed, forms a very inferior pigment. It is exceptional as far as color goes, but it has a tendency to harden oil when ground in this for paint.

The pigment from zinciferous lead ore will to a certain extent have the same fault, and to overcome this I wash the pigment in water acidulated in the sulphuric acid or with a solution of sulphurous acid. This dissolves the zinc, which may now be precipitated again by an alkali or an alkaline carbonate in such a state that it will no longer harden the oil; or to prepare a pure lead pigment the solution may be separated from the lead salts. The pigment is now dried, preferably after first pressing the water out in a filter-press, by which treatment a denser mass is obtained.

I do not intend to claim in this application the process of purifying sublimed lead pigment containing zinc, which consists in mixing the pigment with acidulated water containing sulphuric or sulphurous acid, then separating the soluble from the insoluble residue, and then drying said residue.

Having now fully described my process, what I claim, and desire to protect by Letters Patent, is—

In the process of purifying sublimed lead pigments containing zinc, mixing the pigment with acidulated water containing sulphuric or sulphurous acid, precipitating the zinc solution, and drying the combined product, all substantially as and for the purpose described.

In testimony of which invention I have hereunto set my hand, at Philadelphia, Pennsylvania, this 5th day of June, 1889.

GEORGE T. LEWIS.

Witnesses:
H. B. RIANHARD,
ABNER J. DAVIS.